United States Patent
Nishiyama et al.

(10) Patent No.: US 6,396,680 B1
(45) Date of Patent: May 28, 2002

(54) MONOLITHIC CAPACITOR AND PROCESS FOR PRODUCING THE CAPACITOR

(75) Inventors: Toshiki Nishiyama, Takefu; Takayuki Nishino, Fukui-ken; Yasunobu Yoneda, Takefu, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/727,115

(22) Filed: Nov. 30, 2000

(30) Foreign Application Priority Data

Dec. 10, 1999 (JP) .......................................... 11-351865

(51) Int. Cl.$^7$ ................................................. H01G 4/06
(52) U.S. Cl. ........................ 361/311; 361/312; 361/321; 361/320; 361/321.1; 361/321.4; 570/136; 570/137; 570/138
(58) Field of Search ................................. 361/311, 312, 361/321, 310, 320, 329, 321.5, 322, 321.2, 321.1, 321.4; 570/136, 137, 135

(56) References Cited

U.S. PATENT DOCUMENTS

| | | | | |
|---|---|---|---|---|
| 4,988,650 A | * | 1/1991 | Takagi et al. | 501/134 |
| 5,036,424 A | * | 7/1991 | Yokotani et al. | 361/321 |
| H987 H | * | 11/1991 | Buchanan et al. | 501/137 |
| 5,111,357 A | * | 5/1992 | Chazono et al. | 361/321 |
| 5,155,072 A | * | 10/1992 | Bruno et al. | 501/138 |
| 5,659,456 A | * | 8/1997 | Sano et al. | 361/321.4 |
| 5,861,350 A | * | 1/1999 | Mori et al. | 501/136 |
| 5,877,934 A | * | 3/1999 | Sano et al. | 361/312 |
| 6,034,015 A | * | 3/2000 | Lin et al. | 501/137 |

FOREIGN PATENT DOCUMENTS

| | | |
|---|---|---|
| JP | 060206766 | 7/1994 |
| JP | 6-227861 | 8/1994 |

* cited by examiner

*Primary Examiner*—Dean A. Reichard
*Assistant Examiner*—Nguyen Ha
(74) *Attorney, Agent, or Firm*—Dickstein Shapiro Morin & Oshinsky LLP

(57) ABSTRACT

A monolithic capacitor including a sintered body formed from a $TiO_2$-containing reduction-resistant dielectric ceramic material; a plurality of internal electrodes which are formed inside the sintered body, the electrodes being formed of a base metal; and first and second external electrodes which are formed on the sintered body, the internal electrodes being electrically connected to the external electrodes; wherein the amount of Ti contained in a secondary phase of the sintered body is about 2 wt. % or less as $TiO_2$. A process for producing the monolithic capacitor of the present invention is also disclosed.

10 Claims, 1 Drawing Sheet

MONOLITHIC CAPACITOR AND PROCESS FOR PRODUCING THE CAPACITOR

BACKGROUND OF THE INVENTION

1. Field of the Invention

The present invention relates to a monolithic capacitor which is employed as a temperature-compensating capacitor, and to a process for producing the capacitor; and more particularly to a monolithic capacitor in which a base metal is employed as an internal electrode material, and to a process for producing the capacitor.

2. Background Art

Conventionally, a monolithic capacitor in which an Ni internal electrode is formed inside a sintered ceramic body predominantly comprising $CaZrO_3$—$CaTiO_3$ is known as a temperature-compensating capacitor. In order to produce the monolithic capacitor, firstly, a ceramic slurry is prepared through the following processes:

(1) $CaCO_3$, $ZrO_2$ and $TiO_2$ are calcined in advance and pulverized to thereby obtain calcined powder, a sintering aid is added to the resultant powder, and an organic binder is added to the resultant mixture and the mixture is kneaded, to thereby prepare a ceramic slurry; or (2) pre-calcined $CaZrO_3$ powder and $CaTiO_3$ powder are mixed with a sintering aid, and an organic binder is further added to the resultant mixture and the mixture is kneaded, to thereby prepare a ceramic slurry.

The thus-prepared ceramic slurry is shaped into a ceramic green sheet. Subsequently, an internal electrode is printed on the ceramic green sheet and a plurality of the resultant ceramic green sheets are laminated with one another. Then, onto each of the outermost ceramic green sheets, a ceramic green sheet on which the internal electrode is not printed is laminated, thereby producing a laminate. Thereafter, the laminate is fired to thereby produce the aforementioned sintered ceramic body.

However, in the $CaZrO_3$—$CaTiO_3$ monolithic capacitor produced through the above-described conventional process, the sintered ceramic body does not have a completely uniform structure i.e., a secondary phase may be generated in the ceramic body.

Particularly, when a ceramic slurry is prepared through the aforementioned process (2), a considerable amount of the secondary phase is generated in the resultant sintered ceramic body.

In the case in which the ceramic layer between the internal electrodes is thin, when the secondary phase is generated, a component contained in the phase tends to lower the reliability of the monolithic capacitor.

Therefore, maintaining the reliability of the $CaZrO_3$—$CaTiO_3$ monolithic capacitor is difficult, particularly when the thickness of the sintered ceramic layer between the internal electrodes is as thin as 5 μm or less.

SUMMARY OF THE INVENTION

In view of the foregoing, an object of the present invention is to provide a monolithic capacitor comprising a sintered body formed from a $TiO_2$-containing reduction-resistant dielectric ceramic material, and a process for producing the capacitor. The reliability of the monolithic capacitor can be maintained even when the sintered body of the capacitor has a non-uniform structure, i.e., when the secondary phase is generated in the sintered body in addition to the primary crystal phase, and when the sintered ceramic layer between internal electrodes is thin.

Accordingly, in a first aspect of the present invention, there is provided a monolithic capacitor comprising a sintered body formed from a $TiO_2$-containing reduction-resistant dielectric ceramic material; a plurality of internal electrodes which are formed inside the sintered body, the electrodes being formed of a base metal; and first and second external electrodes which are formed on the sintered body, the internal electrodes being electrically connected to the external electrodes; wherein the amount of Ti contained in a secondary phase of the sintered body is about 2 wt. % or less as reduced to $TiO_2$.

Preferably, the $TiO_2$-containing reduction-resistant dielectric ceramic material predominantly comprises $CaZrO_3$ and $CaTiO_3$.

In a second aspect of the present invention, there is provided a process for producing a monolithic capacitor comprising a sintered body formed from a $TiO_2$-containing reduction-resistant dielectric ceramic material and a plurality of internal electrodes which are formed inside the sintered body, the electrodes being formed of a base metal, which process comprises providing a laminate predominantly formed from the $TiO_2$-containing reduction-resistant dielectric ceramic material, the laminate comprising a plurality of the internal electrodes formed of a base metal; firing the laminate at a temperature-elevation rate of about 5° C./minute or more, to thereby obtain a sintered ceramic body in which the amount of Ti contained in a secondary phase of the sintered ceramic body is about 2 wt. % or less calculated as $TiO_2$; and forming first and second external electrodes on the sintered ceramic body, the internal electrodes being electrically connected to the external electrodes.

Preferably, the $TiO_2$-containing reduction-resistant dielectric ceramic material predominantly comprises $CaZrO_3$ and $CaTiO_3$.

BRIEF DESCRIPTION OF THE DRAWING

Various other objects, features, and many of the attendant advantages of the present invention will be readily appreciated as the same becomes better understood with reference to the following detailed description of the preferred embodiments when considered in connection with an accompanying drawing, in which.

DETAILED DESCRIPTION OF PREFERRED EMBODIMENTS

Figure 1:
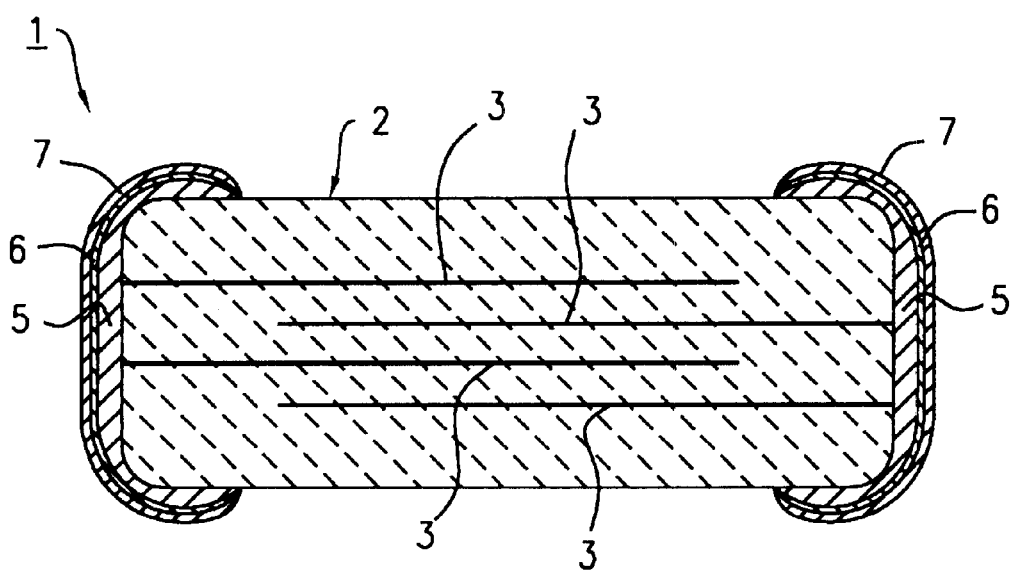
FIG. 1 is a cross-sectional view of the monolithic capacitor of the Example.

The present invention will next be described in detail.

The monolithic capacitor of the present invention comprises a sintered ceramic body formed from a $TiO_2$-containing reduction-resistant dielectric ceramic material. The $TiO_2$-containing reduction-resistant dielectric ceramic material is not particularly limited so long as the material contains $TiO_2$ and exhibits reduction-resistance. The material may be $CaZrO_3$—$CaTiO_3$ ceramic, but is preferably reduction-resistant dielectric ceramic predominantly comprising $CaZrO_3$ and $CaTiO_3$.

In order to obtain a sintered body formed from the reduction-resistant dielectric ceramic material predominantly comprising $CaZrO_3$ and $CaTiO_3$, firstly, a ceramic slurry is prepared. For example, powders of $CaCO_3$, $ZrO_2$ and $TiO_2$, serving as raw materials, are mixed together; the mixture is pulverized and calcined, obtaining a calcined powder; a trace amount of an additive and a sintering aid are added to the resultant powder to thereby obtain a processed raw material powder; and an organic binder or a solvent is added to the powder to thereby prepare a ceramic slurry. Alternatively, calcined $CaZrO_3$ powder and $CaTiO_3$ powder, serving as raw materials, are mixed with a sintering aid and a trace amount of an additive; an organic binder or a solvent is added to the resultant mixture; and the mixture is kneaded to thereby prepare a ceramic slurry.

Subsequently, a ceramic green sheet is formed through a known method from the above-prepared ceramic slurry, and an internal electrode is printed on the sheet. Thereafter, the resultant ceramic green sheets are laminated with one another to thereby produce a laminate. In this case, after lamination of the ceramic green sheets, appropriate pieces of ceramic green sheets on which no internal electrode is printed are laminated on the outermost surfaces of the laminate.

Subsequently, the thus-produced laminate is pressed in a thickness direction, and then fired to thereby produce a sintered ceramic body comprising a plurality of the internal electrodes.

In the present invention, the internal electrodes are formed of a base metal material such as Ni, Co or an alloy thereof. Preferably, the electrodes are formed of Ni, in consideration of production costs.

In the process for producing the monolithic capacitor of the present invention, the aforementioned laminate is fired at a temperature-elevation rate of about 5° C./minute or more. The firing temperature is usually about 1,250–1,320° C.

When the laminate is fired at the aforementioned temperature-elevation rate, the amount of Ti contained in a secondary phase of the sintered ceramic body is about 2 wt. % or less as reduced to $TiO_2$. Therefore, as is apparent from the below-described Example, even when a sintered ceramic layer between the internal electrodes is thin, the reliability of the monolithic capacitor is enhanced.

The monolithic capacitor and the production process therefor of the present invention are characterized in that the amount of Ti contained in the secondary phase of the sintered ceramic body formed from the $TiO_2$-containing reduction-resistant dielectric ceramic material is about 2 wt. % or less as $TiO_2$. Therefore, the reliability of the monolithic capacitor is enhanced.

In the process for producing the monolithic capacitor of the present invention, after the sintered ceramic body is produced as described above, first and second external electrodes are formed such that each of the internal electrodes is electrically connected to either one of the external electrodes so as to provide a capacitor. The first and second external electrodes may be formed on the sintered body through conventional steps for the production of a monolithic capacitor. Also, the external electrodes may be produced through any known method for forming a conductive film, such as application and baking of a conductive paste, vapor deposition, plating or sputtering. The external electrodes may each be formed of a plurality of electrode films.

The conductive material which is employed for forming the first and second electrodes is not particularly limited, and an appropriate metallic material exhibiting excellent conductivity may be employed. Particularly, a base metal such as Cu or Zn is preferably employed in consideration of low production costs. When one of the external electrodes is formed of Cu, it is desirable that an Ni-plated layer and an Sn-plated layer be successively formed on the surface of the electrode. Due to these plated-layers, the reliability and solderability of the Cu external electrode are enhanced.

EXAMPLE

The present invention will next be described in more detail by way of the Example.

$CaCO_3$ powder, $ZrO_2$ powder and $TiO_2$ powder, serving as raw materials constituting a primary component of a dielectric ceramic material, were wet-mixed by use of a ball mill so as to attain weight proportions of 43.6:35.9:15.5. The resultant mixture was pulverized to thereby obtain raw material powder. The raw material powder was calcined at 1,150° C. for two hours, obtaining a calcined raw material. The calcined raw material was further wet-pulverized, and then, to the resultant powder, MnO powder and glass predominantly containing $SiO_2$—$Li_2O$ were added. To the resultant mixture, an organic binder and a solvent were added, and then the mixture was kneaded to thereby obtain a ceramic slurry. A ceramic green sheet was formed from the ceramic slurry, and an Ni paste was applied onto the green sheet to effect printing of an internal electrode. A plurality of the ceramic green sheets on which the internal electrodes were printed were laminated with one another. On the outermost green sheets, ceramic green sheets on which no internal electrode was printed were laminated, producing a laminate.

The thus-produced laminate was pressed in a thickness direction and then the binder was removed in air. Thereafter, the resultant laminate was fired at 1,300° C. for two hours in a reducing atmosphere controlled by a gas mixture of $N_2/H_2/H_2O$.

In the firing profile of the above-produced laminate, the temperature was increased from 800° C. to 1,300° C. (firing temperature) at a rate of 1.0° C./minute, 3.0° C./minute, 5.0° C./minute, 7.0° C./minute or 10.0° C./minute. Laminates were fired at the respective temperature-elevation rates to thereby produce sintered bodies.

Each of the sintered bodies produced through firing at the respective temperature-elevation rate was subjected to measurement for the thickness of a sintered ceramic layer between the internal electrodes of the sintered body. The thickness of the sintered ceramic layer was found to be 4.3 μm.

After the laminate was fired, first and second external electrodes were formed on both the side surfaces of the sintered ceramic body through application of a Cu paste and then baking, such that the electrodes were electrically connected to the internal electrodes. Thereafter, the external electrodes were successively subjected to Ni-plating and Sn-plating to thereby produce a monolithic capacitor as shown in FIG. 1. In FIG. 1, reference numeral 2 represents the sintered ceramic body, 3 the internal electrodes, 5 the first and second external electrodes, 6 the Ni-plated films, and 7 the Sn-plated films.

The reliability of the thus-produced monolithic capacitors was evaluated through an accelerated life test. The test was carried out for five different groups of monolithic capacitors (36 capacitors for each type), the groups corresponding to the respective temperature-elevation rates. In the life test, a voltage of 200 V was applied to the monolithic capacitor at 150° C., and the time taken for the capacitor to break was measured. For each type of monolithic capacitor, the mean time to failure (MTTF) and the m value (variance of MTTF) were obtained. The results are shown in Table 1.

TABLE 1

| Temperature-elevation rate | 1.0° C./min | 3.0° C./min | 5.0° C./min | 7.0° C./min | 10.0° C./min |
|---|---|---|---|---|---|
| MTTF (hours) | 34.8 | 58.6 | 236.1 | 282.6 | 318.4 |
| m value | 0.93 | 1.7 | 5.9 | 7.8 | 8.5 |

As is apparent from Table 1, when the temperature-elevation rate is high, the MTTF of the capacitor in the accelerated life test is long. When the temperature-elevation rate is about 5° C./minute or more, the MTTF of the capacitor is dramatically long and the m value is high, and thus the reliability of the capacitor is enhanced.

In order to confirm the internal structure of each type of monolithic capacitor, cross-sectional planes of the sintered ceramic body parallel to longitudinal and widthwise directions were polished. The planes were subjected to reflection electron observation under a scanning electron microscope (SEM). The thus-observed secondary phase of the sintered body was further subjected to composition analysis by use of a transmission electron microscope (TEM). The results are shown in Table 2.

The crystal phase of the sintered ceramic body of the monolithic capacitor was subjected to X-ray powder diffraction (XRD). As a result, only the diffraction peak of a $CaZrO_3$—$CaTiO_3$ solid solution was detected for all types of monolithic capacitors. The results confirm that no different crystal phase is present in the sintered body of the monolithic capacitor.

Subsequently, the amorphous secondary phase which was not detected through XRD was subjected to composition analysis by use of a TEM. A point for the composition analysis was arbitrarily chosen, and the analysis was carried out at one point in the crystal phase and at three points in the secondary phase.

TABLE 2

| Temperature-elevation rate | Analysis position | CaO | $ZrO_2$ | $TiO_2$ | MnO | $SiO_2$ |
|---|---|---|---|---|---|---|
| 1.0° C./minute | Crystal phase | 32.6 | 49.1 | 17.5 | 0.8 | ND* |
| | Secondary phase | | | | | |
| | 1 | 61.8 | 20.0 | 3.5 | 0.8 | 14.0 |
| | 2 | 60.9 | 21.3 | 3.7 | 0.7 | 13.4 |
| | 3 | 62.2 | 19.7 | 3.7 | 0.9 | 13.5 |
| 3.0° C./minute | Crystal phase | 32.5 | 48.0 | 18.5 | 1.0 | ND |
| | Secondary phase | | | | | |
| | 1 | 61.6 | 19.3 | 3.1 | 0.7 | 15.3 |
| | 2 | 62.8 | 18.4 | 3.6 | 0.8 | 14.4 |
| | 3 | 60.8 | 19.4 | 2.9 | 0.6 | 16.3 |
| 5.0° C./minute | Crystal phase | 32.4 | 47.7 | 19.0 | 0.9 | ND |
| | Secondary phase | | | | | |
| | 1 | 62.7 | 19.1 | 0.2 | 0.7 | 17.3 |
| | 2 | 63.0 | 18.9 | 0.2 | 0.8 | 17.1 |
| | 3 | 61.2 | 19.6 | ND | 0.8 | 18.4 |
| 7.0° C./minute | Crystal phase | 32.8 | 46.8 | 19.5 | 0.9 | ND |
| | Secondary phase | | | | | |
| | 1 | 62.2 | 18.3 | ND | 0.7 | 18.8 |
| | 2 | 61.9 | 18.8 | ND | 0.8 | 18.5 |
| | 3 | 62.7 | 17.8 | ND | 0.7 | 18.8 |
| 10.0° C./minute | Crystal phase | 32.8 | 46.8 | 19.6 | 0.8 | ND |
| | Secondary phase | | | | | |
| | 1 | 61.5 | 17.6 | ND | 0.6 | 20.2 |
| | 2 | 61.0 | 17.5 | ND | 0.6 | 20.9 |
| | 3 | 61.3 | 18.1 | ND | 0.7 | 19.9 |

*ND: not detected

As is apparent from Table 2, the results of composition analysis of the secondary phase correlate with the MTTF of the monolithic capacitors as shown in Table 1. Briefly, when the sintered ceramic body is produced through firing at a temperature-elevation rate of about 5° C./minute or more, the MTTF of the sintered body is long and the amount of Ti contained in the secondary phase of the sintered body is small. In addition, it is apparent that the secondary phase generated in the sintered body after firing is amorphous. The above results suggest that when a large amount of Ti is contained in the secondary phase of the sintered body, Ti is easily reduced during firing in a reducing atmosphere, and thus characteristics of the resultant capacitor, such as insulation resistance, deteriorate and the accelerated life of the capacitor becomes short.

When the temperature-elevation rate is 3.0° C./minute, the amount of $TiO_2$ contained in the secondary phase is 2.9 wt. % or more. The amount of $TiO_2$ greatly differs from this value in the case in which the temperature-elevation rate is 5.0° C./minute. Therefore, as described above, the temperature-elevation rate must be set to about 5° C./minute or more.

In the Example, the ratio by weight of $CaZrO_3$ and $CaTiO_3$ is 66.4:33.6 in the sintered ceramic body, but the ratio is not particularly limited.

The monolithic capacitor of the present invention comprises a sintered body formed from a $TiO_2$-containing reduction-resistant dielectric ceramic material, and the amount of Ti contained in a secondary phase of the sintered body is about 2 wt. % or less as $TiO_2$. Therefore, even when a sintered ceramic layer between internal electrodes is thin, characteristics of the capacitor, such as insulation resistance, barely deteriorate, and the reliability of the capacitor is enhanced.

As is apparent from the Example, particularly in the case in which the $TiO_2$-containing reduction-resistant dielectric ceramic material predominantly comprises $CaZrO_3$ and $CaTiO_3$, even when the sintered ceramic layer between the internal electrodes is thin, the accelerated life of the capacitor can be extended, and thus a monolithic capacitor exhibiting excellent reliability is provided.

According to the process for producing the monolithic capacitor of the present invention, a laminate predominantly formed from the $TiO_2$-containing reduction-resistant dielectric ceramic material is provided, and the laminate is fired at a temperature-elevation rate of about 5° C./minute, to thereby produce a sintered ceramic body. Through the process, the amount of Ti contained in the secondary phase of the sintered body can be decreased to about 2 wt. % or less as $TiO_2$. Therefore, a monolithic capacitor exhibiting excellent reliability is provided.

As is apparent from the Example, in the process of the present invention for producing the monolithic capacitor, in the case in which the $TiO_2$-containing reduction-resistant dielectric ceramic material predominantly comprises $CaZrO_3$ and $CaTiO_3$, even when the sintered ceramic layer between the internal electrodes is thin, the accelerated life of the capacitor can be extended, and thus a monolithic capacitor exhibiting excellent reliability is provided.

What is claimed is:

1. A monolithic capacitor comprising:
    a sintered body comprising a $TiO_2$-containing reduction-resistant dielectric ceramic including a secondary phase and which comprises $CaZrO_3$ and $CaTiO_3$;
    a plurality of internal electrodes comprising a base metal disposed inside the sintered body; and
    first and second external electrodes disposed on the sintered body, the internal electrodes being electrically connected to the external electrodes,
    wherein the amount of Ti containing in a secondary phase of the sintered body is about 2 wt. % or less calculated as $TiO_2$.

2. A monolithic capacitor according to claim 1, wherein the external electrodes comprise a base metal.

3. A monolithic capacitor according to claim 2, wherein the external electrode base metal comprises Cu.

4. A monolithic capacitor according to claim 3, wherein the Cu external electrodes are plated with Ni and the Ni plating is plated with Sn.

5. A monolithic capacitor according to claim 1, wherein the internal electrode base metal comprises Ni.

6. A process for producing a monolithic capacitor comprising a sintered body of $TiO_2$-containing reduction-resistant dielectric ceramic including a secondary phase and which comprises $CaZrO_3$ and $CaTiO_3$ and a plurality of internal electrodes inside the sintered body, the electrodes being formed of a base metal, which process comprises:

provided a laminate of the $TiO_2$-containing reduction-resistant dielectric ceramic material containing a plurality of the internal electrodes of base metal;

firing the laminate at a temperature-elevation rate of about 5° C./minute or more to thereby obtain a sintered ceramic body in which the amount of Ti contained in the secondary phase of the sintered ceramic body is about 2 wt. % or less calculated as $TiO_2$; and forming first and second external electrodes on the sintered ceramic body such that the internal electrodes are electrically connected to the external electrodes.

7. A process for producing a monolithic capacitor according to claim 6, wherein the external electrodes comprise a base metal.

8. A process for producing a monolithic capacitor according to claim 7, wherein the external electrode base metal comprises Cu.

9. A process for producing a monolithic capacitor according to claim 8, wherein the Cu external electrodes are plated with Ni and the Ni plating is plated with Sn.

10. A process for producing a monolithic capacitor according to claim 6, wherein the internal electrode base metal comprises Ni.

* * * * *